Aug. 30, 1927.
L. DANGERFIELD
1,640,927
MILK BOTTLE HOLDER
Filed Aug. 17, 1926
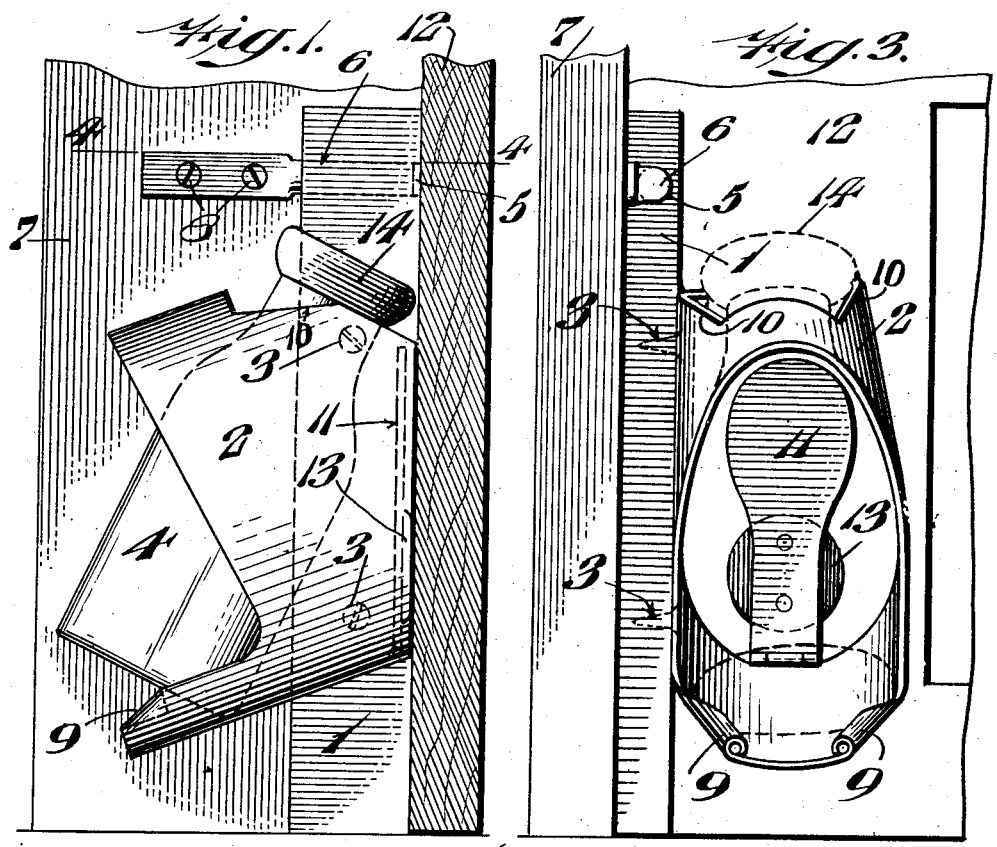
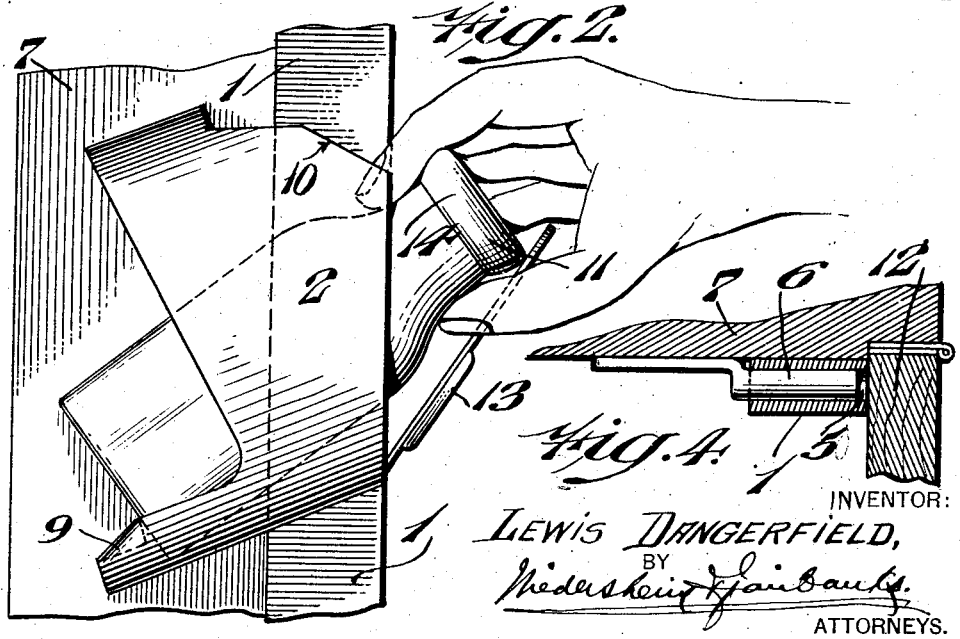
INVENTOR:
LEWIS DANGERFIELD,
BY
ATTORNEYS.

Patented Aug. 30, 1927.

1,640,927

UNITED STATES PATENT OFFICE.

LEWIS DANGERFIELD, OF PHILADELPHIA, PENNSYLVANIA.

MILK-BOTTLE HOLDER.

Application filed August 17, 1926. Serial No. 129,692.

My invention relates to a new and useful holder for milk bottles and the like, and it relates more particularly to a novel milk bottle holder adapted to be detachably secured to the outside of a door, to receive a milk bottle at its outer end, securely to retain the same locked against theft, and to release the bottle through the inner end thereof when the door is opened whereby the placing of milk bottles on the doorsteps may be entirely eliminated, with the elimination of all risk of spilling or breakage, as well as theft of milk.

By the use of my novel milk bottle holder, milk bottles are not only rendered more easily accessible to persons inside the house, and less easily accessible to persons on the outside, but, furthermore, the necessity of stepping outside the house to get the milk is entirely eliminated, thus avoiding exposure of the person during rainy or cold weather. Another advantage of my invention is that the milk in the bottles is protected against extremes of cold and heat in winter and summer respectively, as is the case when milk bottles are placed on concrete doorsteps.

With the above ends in view, my invention consists of an upright standard preferably made of wood, the same being equipped with a bearing at a suitable point along the height thereof, and adapted to slide onto a suitable pin permanently secured to the jamb of a door, a housing preferably stamped out of one piece of spring sheet metal, carried by said upright standard, adapted to receive and retain a milk bottle inserted thereinto from the outside, and a trap door or latch member preferably made of spring sheet metal, formed integral with or hingedly secured to said housing, adapted to open inwardly, to permit the withdrawal of the milk bottle from the inside, when the door is opened.

For the purpose of illustrating my invention, I have shown in the accompanying drawing, forms thereof which are at present preferred by me, since they will give in practice, satisfactory and reliable results, although it is to be understood that the various instrumentalities of which my invention consists can be variously arranged and organized and that my invention is not limited to the precise arrangement and organization of these instrumentalities as herein shown and described.

Referring to the drawings:—

Figure 1 represents a side elevation of a milk bottle holder embodying my invention, the same being shown mounted in operative position on a door.

Figure 2 represents a side elevation similar to that shown in Figure 1, illustrating the manner of withdrawing the milk bottle from my novel bottle holder, from within the house, when the house door is in the open position, (the house door being omitted).

Figure 3 represents a front elevation of my novel bottle holder, with the house door shown in the closed position.

Figure 4 represents a sectional view on line 4—4 of Figure 1, showing the manner of fastening my novel milk bottle to the door jamb.

Referring to the drawings, in which like reference characters designate like parts, 1 designates an upright standard, preferably made of wood or the like, the same carrying the spring metal housing 2, which is firmly secured thereto by means of the screws 3, or the like. 4 designates a milk bottle positioned within said housing. The upright standard 1 is provided with a horizontal bearing opening 5, which is adapted to slide onto the pin 6, permanently and rigidly secured to the door jamb 7 by the bolts or other fastening means 8.

The spring housing 2 is preferably stamped out of one piece of spring sheet metal, and is open and cut out in front, to permit the insertion of a milk bottle from the outside (see Figure 1). When the bottle is thus inserted, against the force of the spring metal of the housing, it is prevented from falling out again or from being withdrawn from without by the inwardly projecting spring lugs 9 formed by turning the terminal edge of the housing 2 over upon itself, thus providing a support for the milk bottle and at the same time preventing the same from being easily withdrawn, (see Figures 1 and 2).

The bead 14 of the neck of the bottle 4 rests upon and is engaged by the edges 10 of the resilient sheet metal housing 2, which interlocks therewith to provide additional support, and also for locking the bottle against the withdrawal thereof from the outside. The housing 2 is further provided at its rear end with the trap door or latch 11, which abuts against the house door 12 when the latter is in the closed position as seen in Figure 1. The latch 11 is provided with a pad 13 of some smooth material such as wood or rubber, to prevent the latch 11 from scratching or otherwise marring the finish on the door 12. The latch 11 serves the purpose of holding the milk bottle in place after the door 12 is opened and before it is desired to withdraw and remove the milk bottle. When the door 12 is in the open position and it is desired to withdraw the milk bottle 4 from the housing 2, it is merely necessary to tilt the latch 11 backwardly and downwardly and subsequently to withdraw the bottle 4 through the rear opening thus provided by the tilting and lowering of the latch 11, as is clearly shown in Figure 2. The latch member 11 is either made integrally with the housing, or hinged to the housing, as shown in the drawing, in either case the latch being yieldably retained in a normal upper position. In the integral construction the inherent resistency of the metal of the housing and latch member is utilized normally to retain the latch in an upper position, while in the hinged construction any suitable auxiliary spring (not shown in the drawing) may be employed for the purpose of yieldably retaining the trap door in an upper position.

It will be noted that the standard 1, carrying the bottle holder proper, is detachably mounted on the door jamb and can be removed at will, since all that is necessary to remove the same, is to open the door of the house and then to slide the standard in an inward direction until the bearing 5 clears the pin or arm 6. This renders the milk bottle holder of my novel construction easily applicable to any door, since all that is necessary to install the same is to fasten the pin 6 to the door jamb 7, at a suitable point, as is clearly shown in Figure 1.

It will also be apparent that I have devised a milk bottle holder which embodies all the advantages above enumerated and one which can be manufactured and installed at a minimum cost. It is within the scope of my invention to provide a plurality of metallic housings 2 on the upright standard 1, thus providing for the reception and retention of a number of milk bottles as may be desired.

It will now be apparent that I have devised a new and useful milk bottle holder which embodies the features of advantage enumerated as desirable in the statement of the invention and the above description, and while I have, in the present instance shown and described a preferred embodiment thereof, which will give in practice, satisfactory and reliable results, it is to be understood that such embodiment is susceptible of modification in various particulars, without departing from the spirit or scope of the invention or sacrificing any of its advantages.

Having thus described my invention, what I claim as new and desire to secure by Letters Patent is:—

1. In a device of the character stated, a generally tubular housing of resilient sheet metal, adapted to be secured to a door jamb, with the rear end thereof abutting the door when the latter is in a closed position, said housing being inclined rearwardly and having an upper opening normally narrower than the neck of a bottle to be confined therein, the edges of said opening being adapted to engage and interlock with the flange of the neck of said bottle, and inwardly projecting lugs in the front end of the housing adapted to engage and support the bottom of said bottle.

2. In a device of the character stated, a generally tubular housing of resilient sheet metal, adapted to be secured to a door jamb, with the rear end thereof abutting the door when the latter is in a closed position, said housing being inclined rearwardly and having an upper opening normally narrower than the neck of a bottle to be confined therein, the edges of said opening adapted to engage and interlock with the flange of the neck of the bottle, inwardly projecting lugs in the front end of the housing adapted to engage and support the bottom of said bottle, a rear latch member extending across the rear end of the housing, adjacent to the door, adapted to be deflected rearwardly and downwardly, when the door is in the open position, and resilient means to retain said latch member normally in an upper position.

LEWIS DANGERFIELD.